United States Patent
Buckel

(10) Patent No.: US 9,401,961 B2
(45) Date of Patent: Jul. 26, 2016

(54) CLOUD-ENHANCED TRAFFIC CONTROLLER

(71) Applicant: Siemens Industry, Inc., Alpharetta, GA (US)

(72) Inventor: Wolfgang Erich Buckel, Austin, TX (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 252 days.

(21) Appl. No.: 14/197,380

(22) Filed: Mar. 5, 2014

(65) Prior Publication Data

US 2015/0256624 A1    Sep. 10, 2015

(51) Int. Cl.
*G06F 15/16* (2006.01)
*H04L 29/08* (2006.01)
*G08G 1/087* (2006.01)
*G08G 1/08* (2006.01)
*G08G 1/081* (2006.01)

(52) U.S. Cl.
CPC .............. *H04L 67/125* (2013.01); *G08G 1/08* (2013.01); *G08G 1/081* (2013.01); *G08G 1/087* (2013.01); *H04L 67/025* (2013.01)

(58) Field of Classification Search
CPC ...... H04L 29/08; H04L 67/025; H04L 67/125
USPC ........................................ 709/202, 204, 206
See application file for complete search history.

(56) References Cited

U.S. PATENT DOCUMENTS

| | | | |
|---|---|---|---|
| 8,004,971 B1 * | 8/2011 | Szabo ................. | H04L 12/4625 370/230 |
| 8,417,442 B2 | 4/2013 | Johnson et al. | |
| 2005/0248469 A1 * | 11/2005 | DeKock ............... | G08G 1/0104 340/905 |
| 2007/0067410 A1 * | 3/2007 | Mulligan ................. | G08G 1/09 709/217 |
| 2013/0097711 A1 * | 4/2013 | Basavapatna ........... | H04W 4/02 726/25 |

* cited by examiner

*Primary Examiner* — Vivek Srivastava
*Assistant Examiner* — Normin Abedin

(57) ABSTRACT

Embodiments include a method for controlling a traffic signal with a cloud-enhanced traffic controller. The method includes receiving the cloud-enhanced traffic controller comprising a memory storing a connection agent and a unique identification assigned to the cloud-enhanced traffic controller and connecting the cloud-enhanced traffic controller to the traffic signal and to a communications network, wherein based upon detecting that the cloud-enhanced traffic controller is connected to the communications network, the connection agent establishes a secure connection to a web service. The method also includes transmitting the unique identification and a status information of the cloud-enhanced traffic controller to the web service.

18 Claims, 4 Drawing Sheets

CLOUD-ENHANCED TRAFFIC CONTROLLER

BACKGROUND

The present invention relates generally to traffic control systems and more specifically to a cloud enhanced traffic controller.

In general, traffic controllers are used to govern the operation of a traffic signal at signaled intersections through the use of signal plans. Traffic controllers traditionally either operate in isolation or are monitored and controlled by a central control system that is connected to the traffic controller. For traffic controllers that operate in isolation, the signal plans that govern the operation of the traffic signals are manually entered and modified through a physical user interface on the traffic controllers, such as a keyboard or touchscreen device.

For traffic controllers that are monitored and controlled by a central control system, the signal plans for the traffic signals additionally can be entered and modified through the central control system. Currently, the central control systems are connected to traffic controllers via private networks because of security concerns. In order for the traffic controller to access the central control system the traffic controller must be configured with a name or network address of the central control system.

SUMMARY

According to one embodiment, a method for controlling a traffic signal with a cloud-enhanced traffic controller is provided. The method includes receiving the cloud-enhanced traffic controller comprising a memory storing a connection agent and a unique identification assigned to the cloud-enhanced traffic controller and connecting the cloud-enhanced traffic controller to the traffic signal and to a communications network, wherein based upon detecting that the cloud-enhanced traffic controller is connected to the communications network, the connection agent establishes a secure connection to a web service. The method also includes transmitting the unique identification and a status information of the cloud-enhanced traffic controller to the web service According to another embodiment, a cloud-enhanced traffic controller having a memory storing a connection agent and a unique identification assigned to the cloud-enhanced traffic controller and a processor configured to operate a traffic signal for an intersection is provided. The processor is configured to execute the connection agent based upon detecting that the cloud-enhanced traffic controller is connected to a communications network, wherein the connection agent causes the processor to establish a secure connection to a web service, transmit the unique identification and a status information of the cloud-enhanced traffic controller to the web service and receive one or more commands for operation of the cloud-enhanced traffic controller from the web service.

According to yet another embodiment, a computer program product for controlling a traffic signal with a cloud-enhanced traffic controller is provided. The computer program product includes a tangible storage medium readable by a processing circuit and storing instructions for execution by the processing circuit for performing a method. The method includes establishing a secure connection between the cloud-enhanced traffic controller and a web service, wherein the cloud-enhanced traffic controller includes a memory storing a connection agent and a unique identification assigned to the cloud-enhanced traffic controller and wherein the connection agent establishes the secure connection based upon detecting that the cloud-enhanced traffic controller is connected to a communications network. The method also includes transmitting the unique identification and a status information of the cloud-enhanced traffic controller to the web service and receiving one or more commands for operation of the cloud-enhanced traffic controller from the web service.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include methods, systems and computer program products for controlling a traffic signal with a cloud-enhanced traffic controller. In exemplary embodiments, the cloud-enhanced traffic controller is configured to automatically and securely connect to a web service once it is connected to a communications network. In exemplary embodiments, the cloud-enhanced traffic controller periodically posts information to the web service regarding the operation of the traffic signal and receives instructions from the web service regarding changes to the operation of the traffic signal. In exemplary embodiments, customers can access and control the cloud-enhanced traffic controller over the Internet by logging on to the web service. As used herein the term web service refers to any piece of software accessible on the internet designed to communicate using TCP/UDP over a secure connection.

Figure 1:
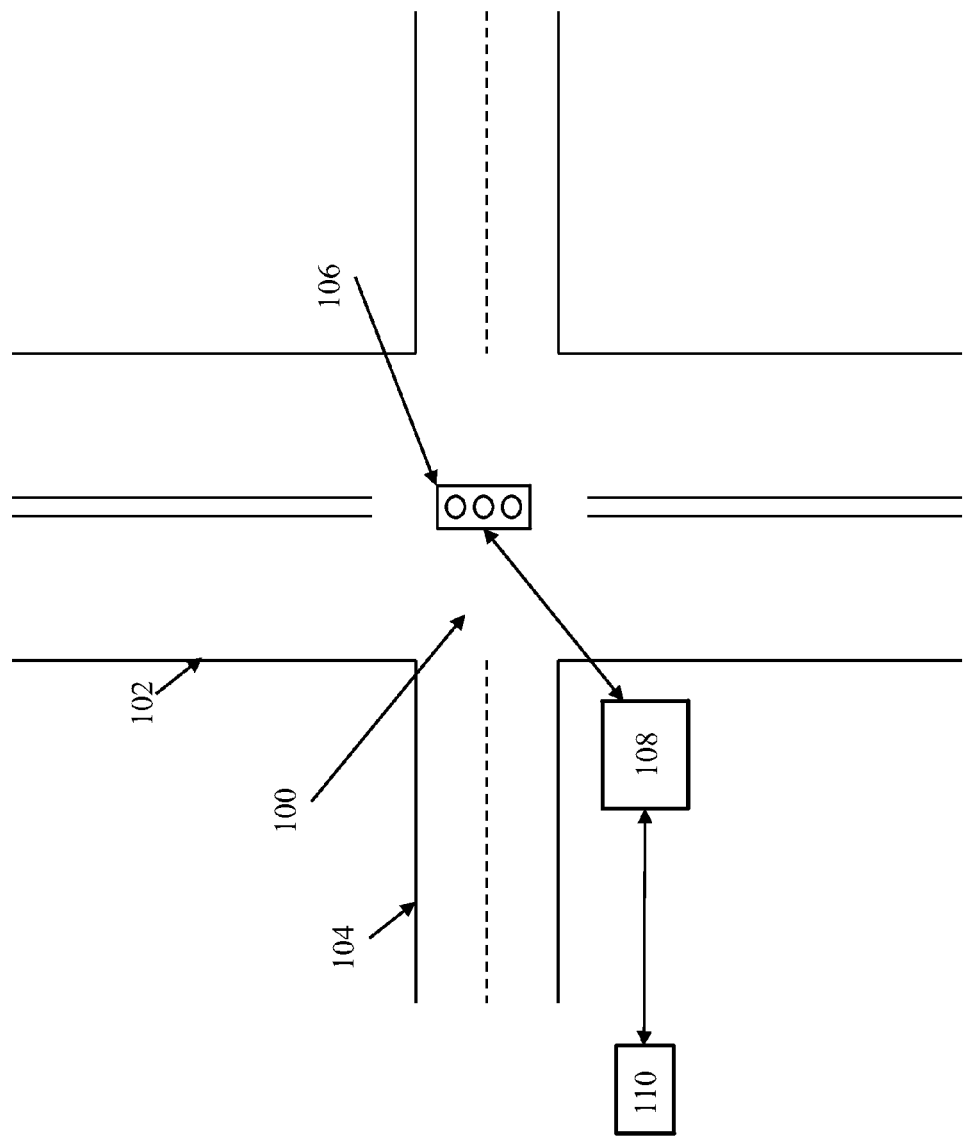
FIG. 1 is a schematic diagram illustrating an intersection in accordance with an exemplary embodiment.

Referring now to FIG. 1, a block diagram of an intersection 100 in accordance with an exemplary embodiment is shown. As illustrated, the intersection 100 of a main street 102 and a side street 104 includes a traffic signal 106 that is configured to control the flow of vehicles through the intersection 100. In exemplary embodiments, the traffic signal 106 is controlled by a traffic controller 108. In exemplary embodiments, the traffic controller 108 is connected to a network 110. In exemplary embodiments, the network 110 may be a private or secure network that is connected to the traffic controller 108 by a fiber optic cable, copper wire, a cellular modem or other wireless network, or by other suitable means. In exemplary embodiments, the traffic controller 108 may receive signal control plans via the network 110 which are used to govern the operation of the traffic signal 106.

Figure 2:
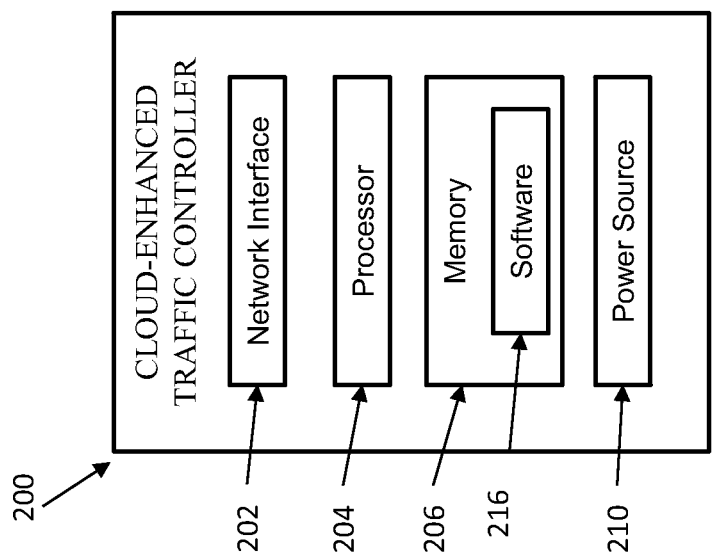
FIG. 2 is a block diagram of cloud-enhanced traffic controller in accordance with an exemplary embodiment.

Referring now to FIG. 2, a block diagram of cloud-enhanced traffic controller 200 in accordance with an exemplary embodiment is shown. As illustrated, the cloud-enhanced traffic controller 200 includes a network interface 202, a processor 204, a memory 206, and a power source 210. In one embodiment, the network interface 202 is configured to connect the cloud-enhanced traffic controller 200 to a communications network via an Ethernet cable or other suitable means. The cloud-enhanced traffic controller 200 is configured to exchange information with a web service via the communications network and to use the processor 204 and the memory 206 to process and store the received information. In exemplary embodiments, the memory 206 may include any of a wide variety of memory devices including volatile and non-volatile memory devices. In exemplary embodiments, the processor 204 may include one or more processing units.

In exemplary embodiments, the memory 206 of the cloud-enhanced traffic controller 200 includes software 216 that includes a variety of applications. One of the applications is traffic control software that controls and monitors the connected traffic signal based on a stored signal plan and/or external detectors such as vehicle and pedestrian detectors. Another application stored in the memory 206 securely connects to a web service over the communications network using a preconfigured address. In exemplary embodiments, the cloud-enhanced traffic controller 200 connects to an internet protocol (IP) network that has a routing gateway or proxy server which allows secure connections to services over the Internet. In exemplary embodiments, the memory 206 includes a trusted certificate that is used to secure the connection over the communications network. In addition, the memory 206 stores programmed persistent identification information that is used to securely connect to a desired web service and to identify the cloud-enhanced traffic controller 200 to the web service.

Those of skill in the art will recognize that not all details are shown in the simplified block diagram shown in FIG. 2. The processor 204 may be configured to perform only the processes described herein, or can also be configured to perform other processes for the operation and management the cloud-enhanced traffic controller 200. The various components of the cloud-enhanced traffic controller 200 as shown in FIG. 2, and the software thereon, may be configured as separate elements connected to communicate with each other or two or more of these components could be integrated into a single device.

Figure 3:
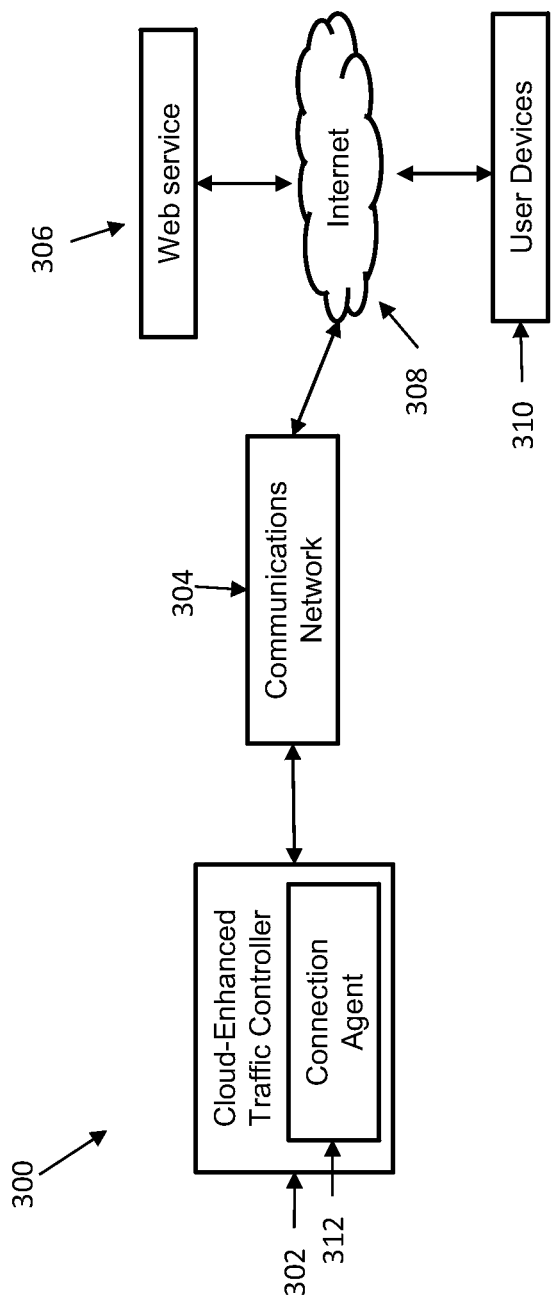
FIG. 3 is a block diagram of traffic control system having a cloud-enhanced traffic controller in accordance with an exemplary embodiment.

Referring now to FIG. 3, a block diagram of traffic control system 300 having a cloud-enhanced traffic controller 302 in accordance with an exemplary embodiment is shown. As illustrated, the traffic control system 300 includes the cloud-enhanced traffic controller 302 which is securely connected to a web-service 306 by a communications network 304, which may be a private or public network, and the Internet 308. The traffic control system 300 also includes one or more user devices 310 that are able to connect to the web-service 306 over the Internet 308. In exemplary embodiments, the cloud-enhanced traffic controller 302 is configured to automatically connect to the web-service 306 once the cloud-enhanced traffic controller 302 is connected to the communications network 304.

In exemplary embodiments, the cloud-enhanced traffic controller 302 includes an application referred to as a connection agent 312. The connection agent 312 is configured to automatically and securely connect to the web service 306 over the communications network 304 once the cloud-enhanced traffic controller 302 is connected to the communications network 304. In exemplary embodiments, the connection agent 312 sends status information about the traffic control application to the web service 306 as well as information about other applications running on the cloud-enhanced traffic controller 302. In exemplary embodiments, the connection agent 312 connects itself to the web service 306 using stored preconfigured configuration information and identifies itself with a unique ID that the cloud-enhanced traffic controller 302 received during manufacturing. In exemplary embodiments, the connection agent 312 may also send transmit a unique customer ID representing the customer who bought the cloud-enhanced traffic controller 302. In another embodiment, the web service 306 may include a database of which device ID was included in each cloud-enhanced traffic controller 302 provided to each customer. Once connected to the web service 306, the connection agent 312 continuously sends status information and queries the web service 306 for instructions for the cloud-enhanced traffic controller 302.

In exemplary embodiments, customers are provided with access credentials to access the web service 306 with a user device 310 over the Internet 308. In exemplary embodiments, the user device 310 may be a traditional computer, a smartphone, a tablet or any other device capable of connecting to the Internet 308. The web service 306 is configured to be accessible via a traditional web browser or by a specialty application, such as a smartphone or tablet application. In exemplary embodiments, the access credentials provided are associated with a customer ID and the connection agent 312 identifies the cloud-enhanced traffic controller 302 as belonging to a specific customer ID. Accordingly, the web service 306 can display a list of all cloud-enhanced traffic controllers 302 that belong to a customer along with the status information for each cloud-enhanced traffic controller 302. In exemplary embodiments, the customer can execute commands on each of the connected cloud-enhanced traffic controllers 302 via the web service 306, these commands include, but are not limited to, changing configuration data, modifying the signal plan, changing the mode of operation, and the like.

In exemplary embodiments, the connection agent 312 is configured to transmit a local configuration of the cloud-enhanced traffic controller 302 to the web service 306, which stores a backup of the local configuration. For example, the web service 306 may include a configuration database that is used to store the local configuration of each cloud-enhanced traffic controller 302. The database may identify the stored configurations by a timestamp and by the unique ID assigned to each cloud-enhanced traffic controller 302. In one embodiment, the cloud-enhanced traffic controller 302 may transmit the local configuration whenever the local configuration changes. In one embodiment, the cloud-enhanced traffic controller 302 may be configured to periodically or continually transmit the local configuration and status information to the web service 306. In exemplary embodiments, the local configuration may include, but is not limited to, the signal plans that the cloud-enhanced traffic controller 302 is using to operate the traffic signal. Likewise, the status information may include, but is not limited to, the operational status information for the traffic signal, such as normal operation or flashing red.

In many cases the configuration, which includes but is not limited to signal plans, for a traffic signal may be manually adjusted at the cloud-enhanced traffic controller 302 by a technician. Once the cloud-enhanced traffic controller 302 determines that its configuration has been updated, the connection agent 312 may transmit the new configuration to the web service 306. Accordingly, the web service 306 can track the changes made to the configuration and can be used to instruct the cloud-enhanced traffic controller 302 to revert to a prior signal plan.

In exemplary embodiments, the web service 306 may generate reports and statistics regarding the operation of cloud-enhanced traffic controllers 302 either automatically according to a schedule set by the customer or manually in response to a request from the customer. In addition, the web service 306 may be configured to manage a schedule for switching between various signal plans and operating modes and for synchronization of the schedules of nearby cloud-enhanced traffic controllers 302.

In exemplary embodiments, the web service 306 continually receives status information, such as traffic information, from connected cloud-enhanced traffic controllers 302. The web service 306 may execute an adaptive traffic control system by analyzing the status information received from connected cloud-enhanced traffic controllers 302 and computing optimized control parameters for each connected cloud-enhanced traffic controllers 302 in regular intervals. Those control parameters are then disseminated to connected traffic controllers where the local traffic control application uses the parameters to adapt the signal plan for the traffic signal.

In exemplary embodiments, the cloud-enhanced traffic controllers 302 provides a plug & play functionality. That is once the customer receives a cloud-enhanced traffic controller 302, the customer only needs to connect the cloud-enhanced traffic controller 302 to a communications network and does not need supply an IP address or name of a traffic controller device in a central monitoring & control system. Rather, the customer can access the cloud-enhanced traffic controller 302 via a website or application client using the credentials provided at purchase.

In one embodiment, the application or website allows a customer to remotely access the front panel of the traffic controller, which is typically is an 8×40 or 16×40 character text display. Accordingly, the customer can view the content displayed on the front panel from a mobile device and can input control commands thereby controlling the traffic controller.

Figure 4:
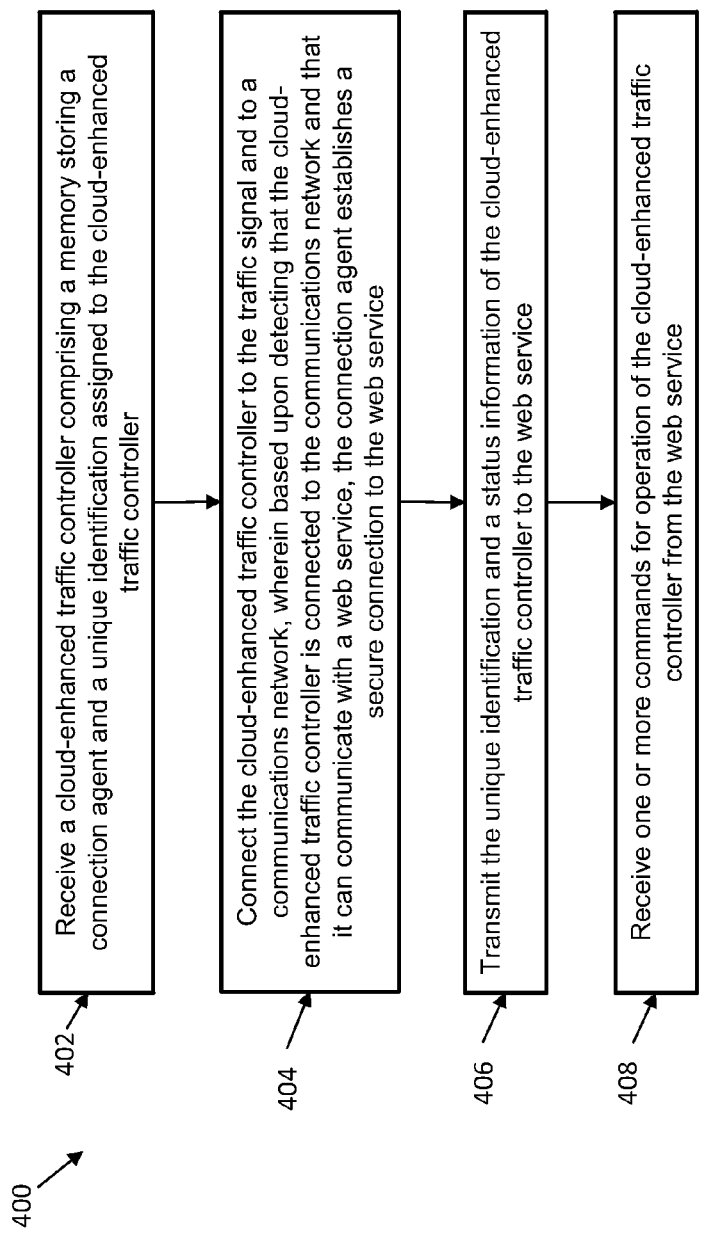
FIG. 4 is a flow chart diagram illustrating a method for monitoring and controlling a traffic signal with a cloud-enhanced traffic controller in accordance with an exemplary embodiment.

Referring now to FIG. 4, a flow chart diagram illustrating a method 400 for controlling a traffic signal with a cloud-enhanced traffic controller in accordance with an exemplary embodiment is shown. As shown at block 402, the method 400 includes receiving the cloud-enhanced traffic controller having a memory storing a connection agent and a unique identification assigned to the cloud-enhanced traffic controller. Next, as shown at block 404, the method 400 includes connecting the cloud-enhanced traffic controller to the traffic signal and to a communications network. Based upon detecting that the cloud-enhanced traffic controller is connected to the communications network that provides access to the internet, the connection agent establishes a secure connection to a web service. As illustrated at decision block 406, the method 400 includes transmitting the unique identification and status information of the cloud-enhanced traffic controller to the web service. Next, as shown at block 408, the method 400 includes receiving one or more commands for operation of the cloud-enhanced traffic controller from the web service.

In exemplary embodiments, the cloud-enhanced traffic controller may be used to detect traffic incidents, such as traffic jams or other abnormal situation, and report the detected incidents to the web service. The web service, may in turn, perform analysis of the collected data and could use the analysis of the data to automatically identify poor performance of traffic operations and make suggestions on how to improve the performance. Furthermore the web service can automatically compute optimized signal plans and command the cloud-enhance traffic controller to run the optimized plans. Analysis of the data could also be used to automatically detect recurring patterns in abnormal traffic situations, e.g., intersection 123 produces severe traffic delay when it rains 90% of the time.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for controlling a traffic signal with a cloud-enhanced traffic controller, the method comprising:

assigning a unique identification to the cloud-enhanced traffic controller;

storing a connection agent in a memory of the cloud-enhanced traffic controller;

connecting the cloud-enhanced traffic controller to the traffic signal and to a communications network;

based upon detecting that the cloud-enhanced traffic controller is connected to the communications network, automatically establishing by the connection agent a secure connection to a web service using stored preconfigured configuration to provide access to the cloud-enhanced traffic controller by indirectly connecting the cloud-enhanced traffic controller to the Internet via the web service without a customer needing to supply an IP address, wherein the secure connection to the web service is secured using a trusted certificate stored in the memory;

transmitting by the connection agent the unique identification for self identifying to the web service with the unique identification of the cloud-enhanced traffic controller and a status information of the cloud-enhanced traffic controller to the web service; and querying the web service by the connection agent for receiving instructions over the communications network for the cloud-enhanced traffic controller.

2. The method of claim 1, further comprising receiving one or more commands for operation of the cloud-enhanced traffic controller from the web service.

3. The method of claim 1, further comprising accessing the web service via the Internet using a customer identification, wherein the customer identification is associated with the unique identification assigned to the cloud-enhanced traffic controller.

4. The method of claim 1, wherein accessing the web service via the Internet is performed via a web browser.

5. The method of claim 1, wherein accessing the web service via the Internet is performed via an application on at least one of a smartphone or a tablet.

6. The method of claim 1, wherein the status information is periodically transmitted to the web service at a predetermined time interval.

7. The method of claim 1, wherein the status information is transmitted to the web service based on a change in the status information.

8. The method of claim 1, further comprising a transmitting local configuration of the cloud-enhanced traffic controller to the web service.

9. The method of claim 8, wherein the local configuration includes a signal plan for the traffic signal.

10. A cloud-enhanced traffic controller comprising:
a memory storing a connection agent and a unique identification assigned to the cloud-enhanced traffic controller; and
A processor configured to operate a traffic signal for an intersection, the processor configured to execute the connection agent based upon detecting that the cloud-enhanced traffic controller is connected to a communications network, wherein the connection agent causes the processor to:
automatically establish a secure connection to a web service upon the cloud-enhanced traffic controller connecting to the communications network using stored preconfigured configuration to provide access to the cloud-enhanced traffic controller by indirectly connecting the cloud-enhanced traffic controller to the Internet via the web service without a customer needing to supply an IP address, wherein the secure connection to the web service is secured using a trusted certificate stored in the memory;
and transmit the unique identification for self identifying to the web service with the unique identification of the cloud-enhanced traffic controller and a status information of the cloud-enhanced traffic controller to the web service;
and query the web service for receiving instructions over the communications network for the cloud-enhanced traffic controller.

11. The cloud-enhanced traffic controller of claim 10, wherein the connection agent further causes the processor to receive one or more commands for operation of the cloud-enhanced traffic controller from the web service.

12. The cloud-enhanced traffic controller of claim 10, wherein the status information is periodically transmitted to the web service at a predetermined time interval.

13. The cloud-enhanced traffic controller of claim 10, wherein the status information is transmitted to the web service based on a change in the status information.

14. The cloud-enhanced traffic controller of claim 10, wherein the connection agent further causes the processor to transmit a local configuration of the cloud-enhanced traffic controller to the web service.

15. The cloud-enhanced traffic controller of claim 14, wherein the local configuration includes a signal plan for the traffic signal.

16. A computer program product for controlling a traffic signal with a cloud-enhanced traffic controller, the computer program product comprising:
a non-transitory computer readable storage medium readable by a processing circuit and storing instructions for execution by the processing circuit for performing a method comprising:
establishing a secure connection between the cloud-enhanced traffic controller and a web service accessible on a communications network that has a routing gateway or a proxy server, wherein the cloud-enhanced traffic controller includes a memory storing a connection agent and a unique identification assigned to the cloud-enhanced traffic controller and wherein the connection agent automatically establishes the secure connection based upon detecting that the cloud-enhanced traffic controller is connected to a the communications network using stored preconfigured configuration to provide access to the cloud-enhanced traffic controller by indirectly connecting the cloud-enhanced traffic controller to the Internet via the web service without a customer needing to supply an IP address wherein the secure connection to the web service is secured using a trusted certificate stored in the memory; and
transmitting by the connection agent the unique identification for self identifying to the web service with the unique identification of the cloud-enhanced traffic controller and a status information of the cloud-enhanced traffic controller to the web service; and
querying the web service by the connection agent for receiving instructions over the communications network for the cloud-enhanced traffic controller.

17. The computer program product of claim 16, wherein the method further comprises receiving one or more commands for operation of the cloud-enhanced traffic controller from the web service.

18. The computer program product of claim 16, wherein the status information is transmitted to the web service based on a change in the status information.

* * * * *